(12) United States Patent
Ancora et al.

(10) Patent No.: US 8,670,429 B2
(45) Date of Patent: Mar. 11, 2014

(54) PROCESS FOR BLIND DETECTION OF A SYNCHRONIZATION SIGNAL FOR LTE

(75) Inventors: Andrea Ancora, Nice (FR); Issam Toufik, Juan les pins (FR)

(73) Assignee: Ericsson Modems SA, Plan-les-Ouates (CH)

(*) Notice: Subject to any disclaimer, the term of this patent is extended or adjusted under 35 U.S.C. 154(b) by 110 days.

(21) Appl. No.: 13/142,782

(22) PCT Filed: Dec. 29, 2009

(86) PCT No.: PCT/EP2009/009312
§ 371 (c)(1), (2), (4) Date: Nov. 30, 2011

(87) PCT Pub. No.: WO2010/076022
PCT Pub. Date: Jul. 8, 2010

(65) Prior Publication Data
US 2012/0069834 A1    Mar. 22, 2012

(30) Foreign Application Priority Data
Dec. 31, 2008  (EP) .................................. 08368025

(51) Int. Cl.
*H04J 1/00* (2006.01)

(52) U.S. Cl.
USPC .......................................................... 370/343

(58) Field of Classification Search
USPC .......................................................... 370/343
See application file for complete search history.

(56) References Cited

U.S. PATENT DOCUMENTS

| | | | |
|---|---|---|---|
| 2006/0114812 A1* | 6/2006 | Kim et al. | 370/206 |
| 2008/0232513 A1* | 9/2008 | Wang et al. | 375/340 |
| 2009/0268602 A1* | 10/2009 | Han et al. | 370/208 |
| 2010/0080114 A1* | 4/2010 | Ratnam et al. | 370/210 |
| 2010/0157910 A1* | 6/2010 | Nentwig et al. | 370/329 |

OTHER PUBLICATIONS

The Journal of China Universities of Posts and Telecommunications vol. 14, issue 2, Jun. 2007. Su Huan, Zhang Jian-hua Ceil search algorithms for the 3G long-term evolution.*

An Efficient Cell Search Algorithm for Preamble-based OFDM Systems. Chih-Liang Chen, Sau-Gee Chen Department of Electronics Engineering and Institute of Electronics, National Chiao Tung University, Hsinchn, Taiwan 300 Hsinchu, Taiwan 300.*

Su, Zhang: "Cell search algorithms for the 3G long-term evolution", Journal of China Universities of Posts and Telecommunications, vol. 14, No. 2, Jun. 2007, pp. 33-37, XP022938142, Beijing, CN.

Chih-Liang Chen et al.: "An efficient cell search algorithm for preamble-based of DM systems", IEEE International Symposium on Personal Indoor and Mobile Radio Communications, Sep. 2008, pp. 1-5, XP031371457, Piscataway, US.

* cited by examiner

*Primary Examiner* — Steven H Nguyen
*Assistant Examiner* — Shah R Zaman
(74) *Attorney, Agent, or Firm* — Coats & Bennett, P.L.L.C.

(57) ABSTRACT

To detect a cell-specific synchronization signal, a modified correlation approach is used, which removes the need for channel estimation.

11 Claims, 4 Drawing Sheets

Mapping between physical-layer cell-identity group $N_{ID}^{(1)}$ and the indices $m_0$ and $m_1$.

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | | | |
| 33 | 3 | 5 | 67 | 8 | 11 | 101 | 14 | 18 | 135 | 21 | 26 | | | |

Fig. 1

PROCESS FOR BLIND DETECTION OF A SYNCHRONIZATION SIGNAL FOR LTE

TECHNICAL FIELD

The present invention relates to wireless digital communications and more particularly to a process for blind detection of a synchronization signal, such as the SSS, for LTE.

BACKGROUND ART

Long Term Evolution (LTE) corresponds to the more recent development in wireless digital communications, following the High Speed Downlink Packet Access HSDPA and High Speed Uplink Packet Access (HSUPA).

Synchronization in LTE communication uses two distinctive synchronization signals, i.e. a so-called Primary Synchronization Signal (PSS) and the so-called Secondary Synchronization Signal (SSS).

The PSS signal is a signal which is known to the UE and which is periodically sent by the cell or basestation and received by the User Equipment (UE) for detecting the initial timing and for computing the strength of the signal.

Once the PSS signal is detected, the UE proceeds with the detection of the SSS which allows completion of the synchronization process and detect the start of the frame as well as the identification of the cell.

Generally speaking, the SSS signal is a 62-bit length sequence based on the use of two interleaved sequences (each having a length of 31 bits) being each selected from a set of 31 known sequences.

The sequence $S(0), \ldots, S(61)$ used for the second synchronization signal is an interleaved concatenation of two length-31 binary sequences. The concatenated sequence is scrambled with a scrambling sequence given by the primary synchronization signal.

Let $S_m = [s_m[1], s_m[2], \ldots, s_m[N]]^T$ be the frequency domain length-62 transmitted SSS sequence (not including DC).

One may write the received signal on the central 62 subcarriers as follows, $$Y = \underline{S}_m H + v$$

where Y is the N×1 received signal vector, $H = [H_1, H_2, \ldots, H_N]^T$ is the channel gain vector and v is the noise vector. $\underline{S}_m$ is a matrix defined in function of the transmitted sequence by.

$$\underline{S}_m = \text{diag}(s_m[1], s_m[2], \ldots, s_m[N])$$

One considers Maximum Likelihood detection of the SSS sequence and analysis both coherent and non coherent detections.

Two basic techniques are basically known for achieving detection of the SSS signal: 1. the non coherent method and 2. the coherent method.

1. First Known Technique: Non Coherent Detection of the SSS

Non coherent detection assumes that the channel gains are not known to the detector. The Maximum Likelihood detection of the SSS sequence consists on finding the sequence maximizing the probability of receiving Y knowing that the sequence $S_m$ is transmitted $$p(Y|S_m)$$

The signal vector Y is Gaussian conditionally on the transmitted sequence $S_m$ and on the channel gains vector H. Its conditional probability (with the assumption of white i.i.d. Gaussian noise with variance $N_0$ i.e. $\underline{R}_n = N_0 \underline{I}$) is given by $$p(Y|S_m, H) = \frac{1}{(\pi N_0)^N} \exp\left(-\frac{(Y - \underline{S}_m H)^N (Y - \underline{S}_m H)}{N_0}\right)$$

$p(Y|S_m)$ can be obtained from $p(Y|S_m, H)$ by averaging with respect to the channel vector H.

$$p(Y|S_m) = \int_H p(Y|S_m, H) p(H) dH$$

where $$p(H) = \frac{1}{\pi^N \det(\underline{R}_H)} \exp(-H^H \underline{R}_H^{-1} H)$$

Thus we have $$\hat{S}_m = \arg\max \left\{ \frac{\frac{1}{(\pi N_0)^N \pi^N \det(\underline{R}_H)}}{\int_H \exp\left(-\left(\frac{(Y - \underline{S}_m H)^H (Y - \underline{S}_m H)}{N_0} + H^H \underline{R}_H^{-1} H\right)\right) dH} \right\}$$

After some computations and simplifications we find that $$\int_H \exp\left(-\left(\frac{(Y - \underline{S}_m H)^H (Y - \underline{S}_m H)}{N_0} + H^H \underline{R}_H^{-1} H\right)\right) dH =$$
$$\frac{\pi^N}{\det(\underline{A})} \exp(B_m^H \underline{A}_m^{-1} B_m - C)$$

Where $$\underline{A}_m = \frac{1}{N_0} \underline{S}_m^H \underline{S}_m + \underline{R}_H^{-1}$$

$$B_m = \frac{1}{N_0} \underline{S}_m^H Y \text{ and}$$

$$C = \frac{1}{N_0} Y^H Y$$

Since $\underline{S}_m$ is a diagonal matrix with binary elements, we have that $\underline{S}_m^H \underline{S}_m = I$. Hence we have $$\underline{A}_m = \frac{1}{N_0} I + \underline{R}_H^{-1}$$

which does not dependent on m.
Since also the value of C does not depend on m, the detection decision reduces to $$\hat{S}_m = \arg\max\{\exp(B_m^H \underline{A}_m^{-1} B_m)\}$$

The logarithm function is a monotonic, thus the detected sequence is the one maximizing $$B_m^H \underline{A}_m^{-1} B_m$$

The non coherent detection shows some significant drawbacks.

Firstly, the non-coherent detection performances strongly depend on the channel coherence bandwidth. The non-coherent detection method work very well when the channel is frequency flat, but this is not the case in reality and thus the SSS decoding performance will degrade and are not robust to the different propagation environment.

Secondly, the non-coherent detection significantly depends on the error on timing. In fact a timing offset will introduce a phase rotation in the frequency domain which will make the non-coherent detection impractical.

2. Second Known Technique: Coherent Detection of the SSS

The second known technique is the coherent technique which assumes the knowledge of the channel characteristics (ie the frequency response the channel) what may results, for instance, from the already achieved detection of the PSS which, when used as a pilot, may also serve for channel estimation.

Under this assumption, the Maximum Likelihood detection of the SSS sequence consists on finding the sequence maximizing the probability of receiving Y knowing that the sequence $S_m$ is transmitted.

The conditional pdf of Y given $S_m$ and H is given by $$p(Y \mid S_m, H) = \frac{1}{(\pi N_0)^N} \exp\left(-\frac{(Y - \underline{S_m}H)^H(Y - \underline{S_m}H)}{N_0}\right)$$

$$= \frac{1}{(\pi N_0)^N} \exp\left(-\frac{\|Y - \underline{S_m}H\|^2}{N_0}\right)$$

The ML decision rule is then, $$\hat{S}_m = \operatorname{argmin}\{\|Y - \underline{S_m}H\|^2\}$$

$$= \operatorname{argmin}\left\{\sum_{i=0}^{N-1} |Y[i] - H_i S_m[i]|^2\right\}$$

When using the channel estimation from the PSS, a problem may arise in the case where another base station, time-synchronized with the target base station, has the same PSS. In this case the estimated channel will be the sum of the channel from the targeted cell and the interfering cell with the same PSS. This error on the channel estimation will result in a considerable degradation of performance in the case of coherent detection.

This is a clear drawback of the coherent detection method and there is therefore a need for an alternative method for detecting the SSS which overcomes those drawbacks.

SUMMARY OF THE INVENTION

It is a first object of the present invention to provides an effective method for detecting a synchronization signal in a digital communication system complying the LTE standard.

It is a further object of the present invention to provide a method for detecting the Secondary Synchronization Signal (SSS) for LTE which does not require the preliminary knowledge of the channel characteristics.

It is still another object of the present invention to provide a method for detecting the SSS which shows robustness to timing offset and channel coherence bandwidth and which undo the channel phase without estimating it.

It is still a further object of the present invention to provide a method for detecting the SSS which still operate when two interfering base station share the same PSS.

Those and other objects of the present invention are provided by means of a method for detecting a synchronization signal from a received signal of a Long Term Evolution (LTE) communication.

The detection of the synchronization signal is based on the following steps:

receiving (22) a signal $\{Y[i]\}_{i=0,\ldots,N}$ from a communication channel;

performing a synchronization detection among a set of M predetermined synchronization sequences $S_m$ (m=0 to M−1) comprising the steps of:

for each predetermined sequence $S_m$, computing (24) a vector $Z_m$ from said received signal $\{Y[i]\}_{i=0,\ldots,N}$ in accordance with the formula:

$$Z_m[i]=S_m[i]Y[i]$$

with $S_m[i]$, $Y[i]$ and $Z_m[i]$ being the element (i) of sequence $S_m$, the received signal Y and the computed vector $Z_m$ respectively.

The method in accordance with the invention computes a vector $T_m$ by multiplying the symbol in one carrier by the complex conjugate of the symbol in one of the two consecutive carriers; and maximizing or minimizing a cost function applied on said vector $T_m$ in order to determine the particular sequence offering higher relevance.

In one particular embodiment, the method selects the particular sequence by maximizing the following value:

$$\hat{S}_m = \operatorname{argmax}\left\{\left|\sum_{i=0}^{N-1} T_m[i]\right|^2\right\}$$

The method of the invention is particularly useful for detecting the Secondary Synchronization Signal (SSS) which is to be detected further to the detection of the Primary Synchronization Signal (PSS).

In one embodiment, vector $T_m$ is computed as follows:

$$T_m[i]=Z_m[i]\times Z_m^*[i+1]$$

Alternatively, or cumulatively, a vector $U_m$ may be computed in accordance with the following formula in order to extend the selection of the sequence:

$$U_m[i]Z_m[i]\times Z_m^*[i+2]$$

This allows to get rid of the problem caused by the presence of the interfering cell with same PSS and same first SSS segment.

The method can also be adapted for selecting the two segments of the synchronization signals, and for successively providing detection of those two segments.

The invention is useful for carrying out an telecommunication apparatus adapted to the LTE standard.

DESCRIPTION OF THE DRAWINGS

Other features of one or more embodiments of the invention will best be understood by reference to the following detailed description when read in conjunction with the accompanying drawings.

FIG. 1 shows a table illustrating the mapping between the physical-layer cell-identity groups

DESCRIPTION OF THE PREFERRED EMBODIMENTS

There is now described a method for achieving both the problem of channel estimation in the case of the existence of another cell with same PSS for coherent detection, and the performance dependence on the coherence bandwidth for non-coherent detection.

It will be particularly considered the detection of the Secondary Synchronization Signal (SSS) which is to be detected further to the detection of the Primary Synchronization Signal (PSS).

In the embodiment, it will be considered the use of 168 secondary synchronization sequences or signals, being each carried by a set of 62 subcarriers.

It should be noticed that those figures are only given as an example and that the process may be easily adapted to a different set of secondary synchronization sequences, and a different number of subcarriers.

Figure 2:
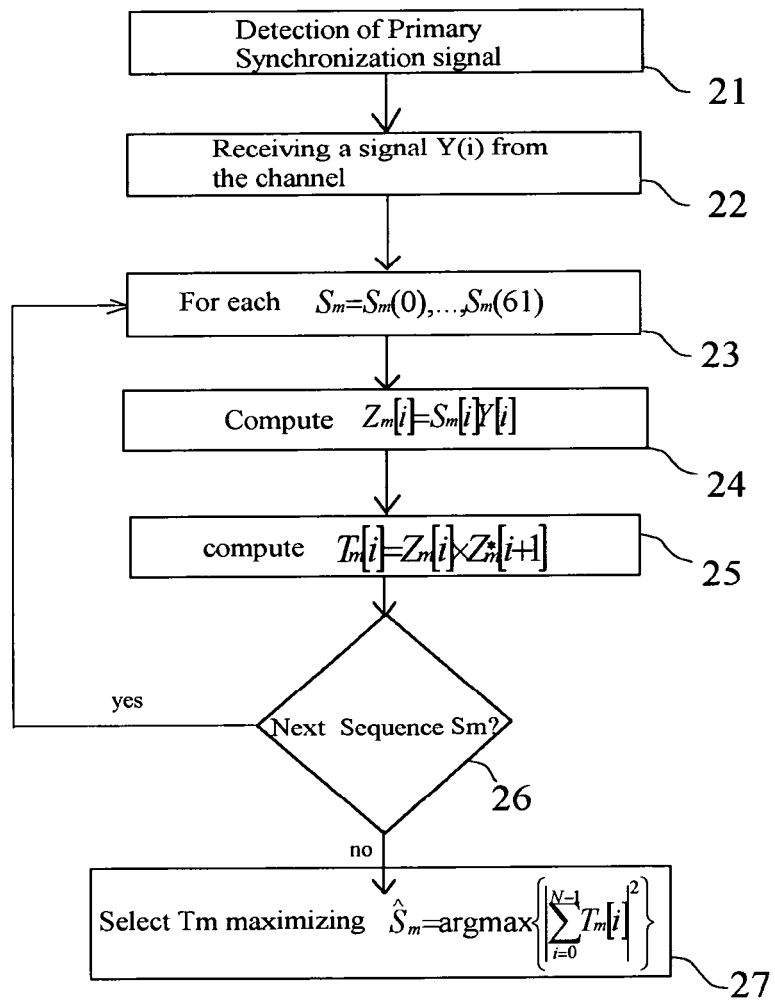
FIG. 2 illustrates one embodiment of the method for detecting a synchronization signal for LTE communications.

The process will now be described in reference with FIG. 2.

In one embodiment, the process starts with a step 21 consisting in the detection of the first synchronization signal (PSS) in order to achieve primary synchronization and proper initial timing detection of the block to be processed. The detection of such a primary synchronization signal is well known to the skilled man and different principles may be used which are not part of the subject invention. As known by the skilled man, such primary synchronization is required for allowing proper processing of the received OFDM signal, and particularly proper FFT processing for generating the OFDM symbol in the frequency domain.

Once the initial synchronization is achieved, the process then proceeds in a step 22 with the receiving of OFDM symbol $Y=[Y(0), \ldots, Y(61)]$ corresponding to the SSS sub-carriers position within the frequency domain. In one embodiment, the OFDM symbol has 64 components based on 64 subcarriers from which the 62 length signal corresponding to the SSS. Larger OFDM symbol sizes can also be considered, from which always we extract the 62 sub-carriers corresponding to the SSS.

Then, the process enters in a loop in a step 23 for successively considering each sequence $S_m=S_m(0), \ldots, S_m(61)$ of a predetermined set of 168 sequences (with m=1 to 168 in the considered embodiment)

The process then proceeds with a step 24 where the received signal is first element wise multiplied by the considered sequence $S_m=S_m(0), \ldots, S_m(61)$ in order to compute a vector $Z_m$ in accordance with the formula:

$$Z_m[i]=S_m[i]Y[i]$$

The skilled man will notice that steps 21-24 correspond to the first steps which were already used in the so-called non coherent method.

However, the method which is proposed now deviates with a step 25 from the non coherent method in the way that, instead of adding all the components of vector $Z_m$ in order to complete correlation of all the candidate sequences $S_m$, vector $Z_m$ is used for deriving a new vector $T_m$, still based on 62 subcarriers, and which component i results from the multiplication (i), in accordance with the formula $$T_m[i]=Z_m[i]\times Z_m^*[i+1]$$

Note that for the last element in the vector (the element N−1), since there is no next element in the vector, we can either consider not multiplying this element (and thus not considering it in the next step) or multiply it with complex conjugate of the previous element N−2.

It can be seen that the symbol in one carrier is then multiplied by the complex conjugate of the symbol in the next carrier.

It has been observed, and this is a significant advantage resulting from the proposed method, that this computation tends to eliminate the channel phase distortion without having to estimate it. This is achieved by the strong correlation of the channel for adjacent sub-carriers which was observed by the inventors.

The process then proceeds to a step 26 which is a test for determining whether a new sequence $S_m$ has to be considered, in which case the process loops back to step 23 above.

When all the sequences $S_m$ included in the predetermined set of synchronization signals have been processed, the process then completes the detection process with a step 27 with the selection of the particular value of $T_m$—corresponding to one particular sequence—offering higher relevance.

Different maximization or minimization criteria may be used for that purpose. In the preferred embodiment, the sequence maximizing the following criterium is selected:

$$\hat{S}_m = \mathrm{argmax}\left\{\left|\sum_{i=0}^{N-1} T_m[i]\right|^2\right\}$$

This allows the detection of the most likely sequence used as a synchronization signal.

Figure 3:
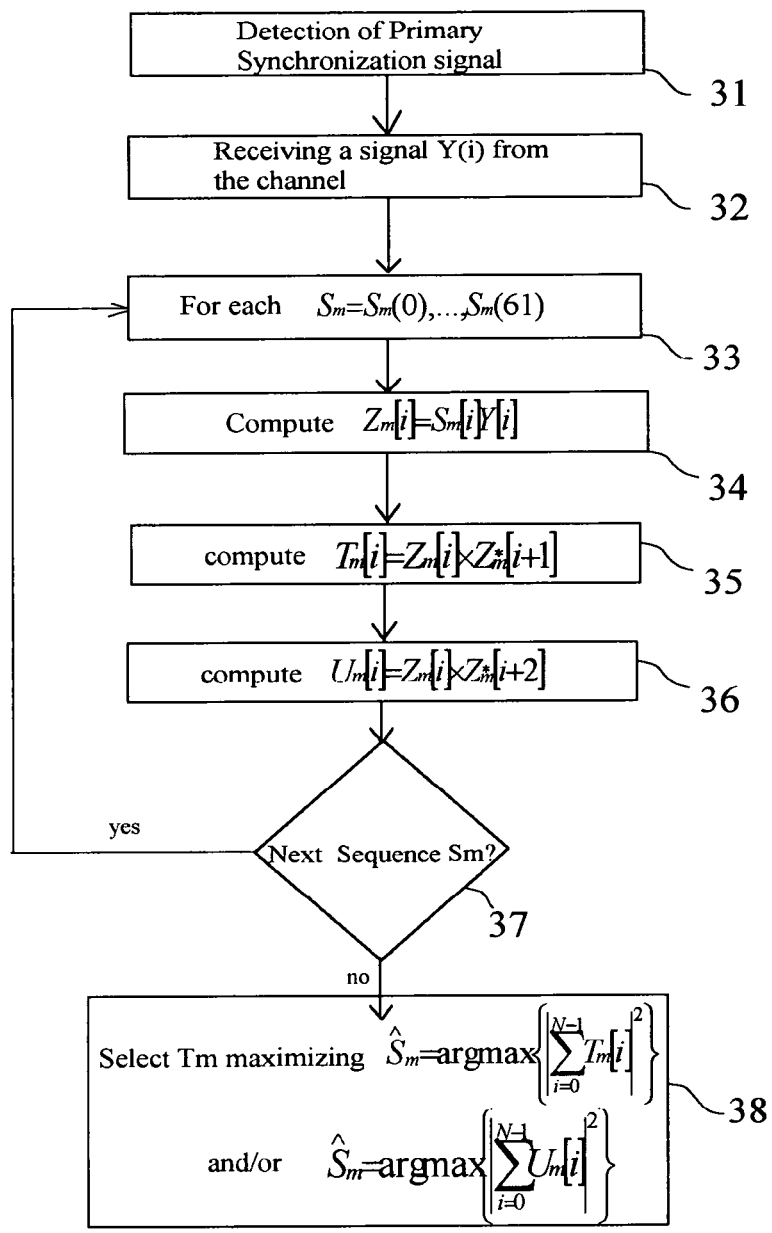
FIG. 3 illustrates a second embodiment of a method for detecting a synchronization signal for LTE communications.

With respect to FIG. 3, there is now illustrated one particular embodiment which offers higher robustness with respect to the process which was discussed above in reference to FIG. 2.

Steps 31-35 are identical to steps 21-25 which were described above.

After having computed the value of $$T_m[i]=Z_m[i]\times Z_m^*[i+1]$$

the process proceeds to a step 36 where the symbol in the carrier i is multiplied by the complex conjugate of the symbol in carrier i+2

$$U_m[i]Z_m[i]\times Z_m^*[i+2]$$

It can be seen that the combination of steps 35 and 36 results in the symbol in one carrier being multiplied by the complex conjugate of the symbol in the next two consecutive carriers.

The process then proceeds to a step 37 which is a test for determining whether a new sequence $S_m$ has to be considered, in which case the process loops back to step 33 above.

When all the sequences $S_m$ included in the predetermined set of synchronization signals have been processed, the process then completes the detection process with a step 38 with the selection of the value, among the computed values of $T_m$ or $U_m$ offering higher correlation and relevance.

Again, different maximization or minimization of criterions may be used.

In one embodiment, the process proceeds with the maximization of the following values:

$$\hat{S}_m = \text{argmax}\left\{\left|\sum_{i=0}^{N-1} T_m[i]\right|^2\right\}$$

and $$\hat{S}_m = \text{argmax}\left\{\left|\sum_{i=0}^{N-1} U_m[i]\right|^2\right\}$$

In another embodiment, the process proceeds with the maximization of the following values:

$$\hat{S}_m = \text{argmax}\left\{\left|\sum_{i=0}^{N-1} U_m[i]\right|^2\right\}$$

The maximum value returns the particular sequence $S_m$ which shows higher relevance and thus can be used for the detection of the signal.

In this case, not only we get ride rid of the problem caused by the presence of the interfering cell with same PSS and same first SSS segment, but this interferer become a source of diversity (For the first SSS segment) offering better probabilities of the SSS sequence correct detection.

It can be seen, that the process achieves robust SSS detection, by undoing the channel phase distortion without the need of estimating it. There is thus provided a robust detection method which provides efficient performance even when the channel is not frequency flat.

There is now discussed with reference to FIG. 4 one particular embodiment which allows detection of one particular short sequence used to create the interleaved SSS sequence.

The SSS LTE sequence is constituted of interleaved short sequences, as shown in FIG. 1.

Figure 4:
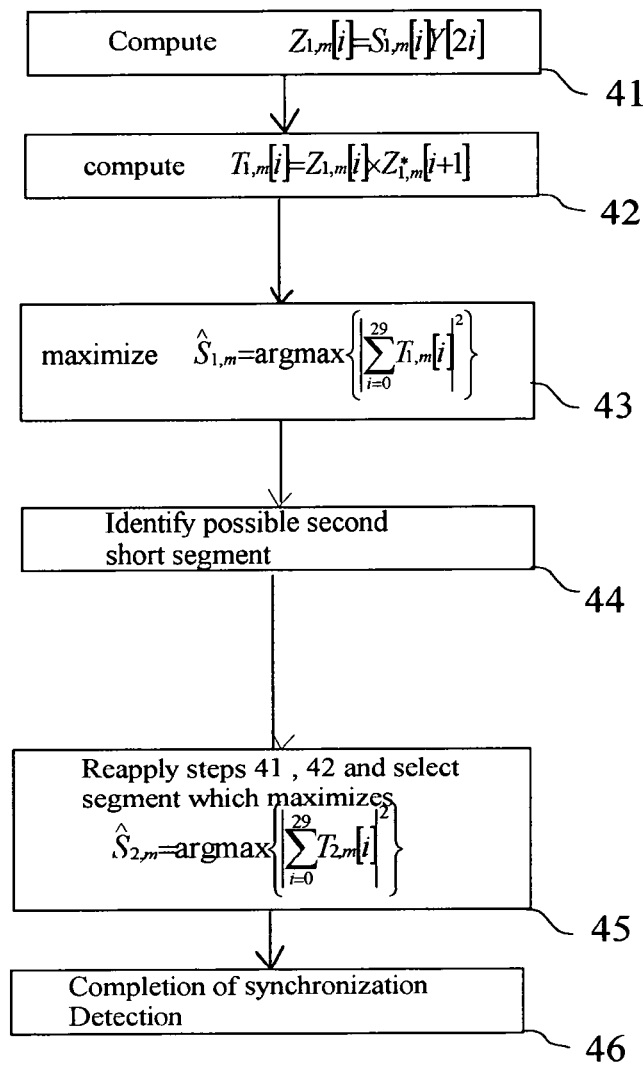
FIG. 4 illustrates a further embodiment of one method for detecting a synchronization signal in accordance with the present invention.

The process of FIG. 4 first proceeds with the detection of the first short sequence which allows knowing the descrambling code used for the second sequence. This information is then used to detect the second short sequence:

Let $Y_1=[Y(0), Y(2), Y(4) \ldots, Y(60)]$ and $Y_2=[Y(1), Y(3), Y(5) \ldots, Y(61)]$ be the deinterleaved first and second received segments.

In a step 41, the process computes the element wise product of $Y_1$ with all possible first short segments $S_{1,m}$ (sequences of length 31):

$Z_{1,m}[i]=S_{1,m}[i]Y[2i]$, for $i=0,\ldots,30$

The ith resulting element is multiplied in a step 42 by the complex conjugate of the i+1-th element.

$T_{1,m}[i]=Z_{1,m}[i]\times Z_{1,m}*[i+1]$, for $i=0,\ldots,29$

Then, in a step 43, the process proceeds with the selection of the first segment which maximizes $$\hat{S}_{1,m} = \text{argmax}\left\{\left|\sum_{i=0}^{29} T_{1,m}[i]\right|^2\right\}$$

Once this first segment is detected, the process then identify in a step 44 the possible associated second segments. FIG. 1 shows the possible combination which allows rapid selection of possible candidates for the second segments (For both timing hypothesis).

The process then proceeds with a step 45 which computes in the same way as in steps 41-42 the correlation between the second received second segment $Y_2$ and the possible second segments associated to the detected first segment and chose the one maximizing the correlation as in step 43 above.

The combination of the first and second segments provide us with the SSS Id.

The invention claimed is:

1. A method of detecting a synchronization signal from a received signal in an Orthogonal Frequency Division Multiplex (OFDM) based communication system, the method comprising the steps of:
    detecting a first primary synchronization signal;
    receiving a signal Y from a communication channel, the signal Y being a OFDM signal comprising a set of subcarriers; and
    performing a second synchronization detection among a set of M predetermined synchronization sequences $S_m$ (m=0 to M-1), the second synchronization detection comprising the further steps of:
        for each predetermined sequence $S_m$, computing a vector $Z_m$ from the received signal Y in accordance with the formula $Z_m[i]=S_m[i]Y[i]$, where $S_m[i]$, $Y[i]$ and $Z_m[i]$ are the element (i) of sequence $S_m$, the received signal Y and the computed vector $Z_m$, respectively;
        computing at least one of a vector $T_m$ and $U_m$ by multiplying the symbol in one subcarrier by the complex conjugate of the symbol in the first or second consecutive subcarriers, respectively; and
    maximizing or minimizing a cost function applied on the vector $T_m$ or $U_m$ in order to determine the particular sequence yielding the best cost function.

2. The method of claim 1 wherein the particular sequence is selected by maximizing the value $$\hat{S}_m = \text{argmax}\left\{\left|\sum_{i=0}^{N-1} T_m[i]\right|^2\right\}.$$

3. The method of claim 1 wherein computing a vector $T_m$ comprises computing $T_m$ according to: $T_m[i]=Z_m[i]\times Z_m*[i+1]$.

4. The method of claim 1 wherein computing a vector $U_m$ comprises computing $U_m$ according to: $U_m[i]=Z_m*[i+2]$.

5. The method of claim 1 further comprising computing both $T_m[i]=Z_m[i]\times Z_m*[i+1]$ and $U_m[i]=Z_m[i]\times Z_m*[i+2]$ and selecting the particular sequence from the maximizing of $$\hat{S}_m = \text{argmax}\left\{\left|\sum_{i=0}^{N-1} T_m[i]\right|^2\right\} \text{ and } \hat{S}_m = \text{argmax}\left\{\left|\sum_{i=0}^{N-1} U_m[i]\right|^2\right\}.$$

6. The method of claim 1 further comprising:
    computing $U_m[i]=Z_m[i]\times Z_m*[i+2]$; and
    selecting the particular sequence from the maximizing of $$\hat{S}_m = \text{argmax}\left\{\left|\sum_{i=0}^{N-1} U_m[i]\right|^2\right\}.$$

7. The method of claim 1 wherein the set of synchronization sequences comprises 168 secondary synchronization sequences or signals, being each carried by a set of 62 subcarriers.

8. The method of claim 1 wherein each sequence comprises interleaved short segments.

9. The method of claim 8 wherein the method is performed first for the detection of the first segment and then subsequently for the detection of the second segment.

10. A method of detecting a synchronization signal from a received signal of a Long Term Evolution (LTE) communication, the synchronization signal comprising a first short segment $Y_1=[Y(0), Y(2), Y(4) \ldots, Y(60)]$ and a second interleaved segment $Y_2=[Y(1), Y(3), Y(5) \ldots, Y(61)]$, the method comprising:

a telecommunication apparatus performing the steps of:
 (a) computing the element-wise product of $Y_1$ with all possible first short segments $S_{1,m}$ according to $Z_{1,m}[i]=S_{1,m}[i]Y[2i]$, for $i=0, \ldots, 30$;
 (b) multiplying the i th resulting element by the complex conjugate of the i+1-th element, according to $T_{1,m}[i]=Z_{1,m}[i] \times Z_{1,m}^*[i+1]$, for $i=0, \ldots, 29$;
 (c) selecting the first segment which maximizes $$\hat{S}_{1,m} = \mathrm{argmax}\left\{ \left| \sum_{i=0}^{29} T_{1,m}[i] \right|^2 \right\};$$

(d) identifying the possible second segment in a predetermined table; and
 (e) performing steps (a-c) to select the second segment.

11. An apparatus operative to detect a synchronization signal in an Orthogonal Frequency Division Multiplex (OFDM) based communication system, the apparatus comprising:

a receiver operative to receive a signal Y from a communication channel, the signal being a OFDM signal comprising a set of subcarriers;
a primary detector operative to detect a primary synchronization signal; and
a secondary detector operative to perform a second synchronization detection among a set of M predetermined synchronization sequences $S_m$ (m=0 to M−1), by:
 for each predetermined sequence $S_m$, computing a vector $Z_m$ from the received signal Y in accordance with the formula $Z_m[i]=S_m[i]Y[i]$, where $S_m[i]$, $Y[i]$ and $Z_m[i]$ are the element (i) of sequence $S_m$, the received signal Y and the computed vector $Z_m$, respectively;
 computing at least one of a vector $T_m$ and $U_m$ by multiplying the symbol in one subcarrier by the complex conjugate of the symbol in the next one or two consecutive subcarriers, respectively; and
 maximizing or minimizing a cost function applied on the vector $T_m$ or $U_m$ in order to determine the particular sequence yielding the best cost function.

* * * * *